March 21, 1939.  N. M. RUSH  2,151,335
TAILGATE MECHANISM FOR VEHICLES
Filed Feb. 13, 1936  2 Sheets—Sheet 1
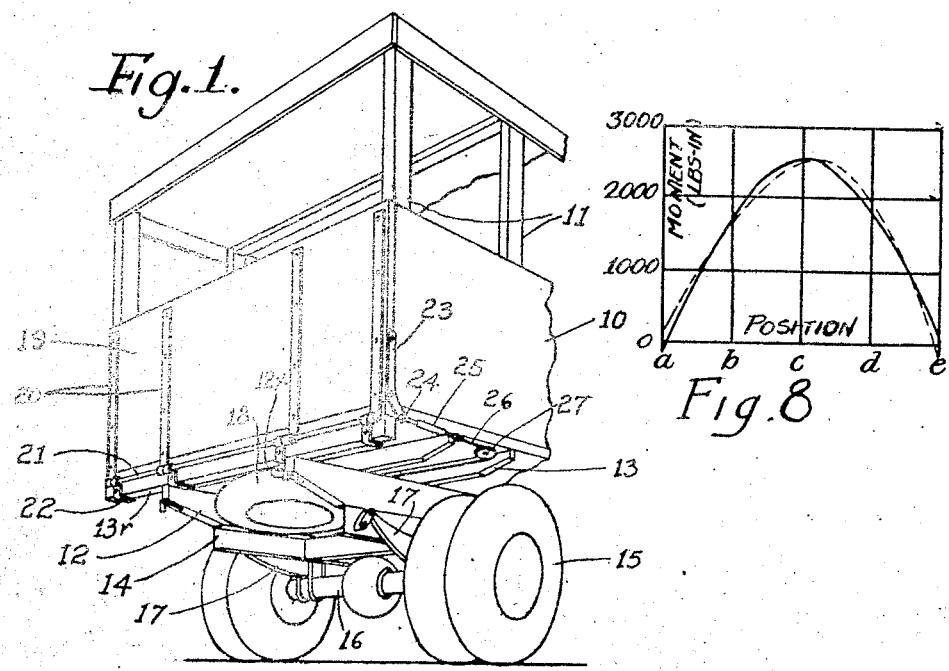
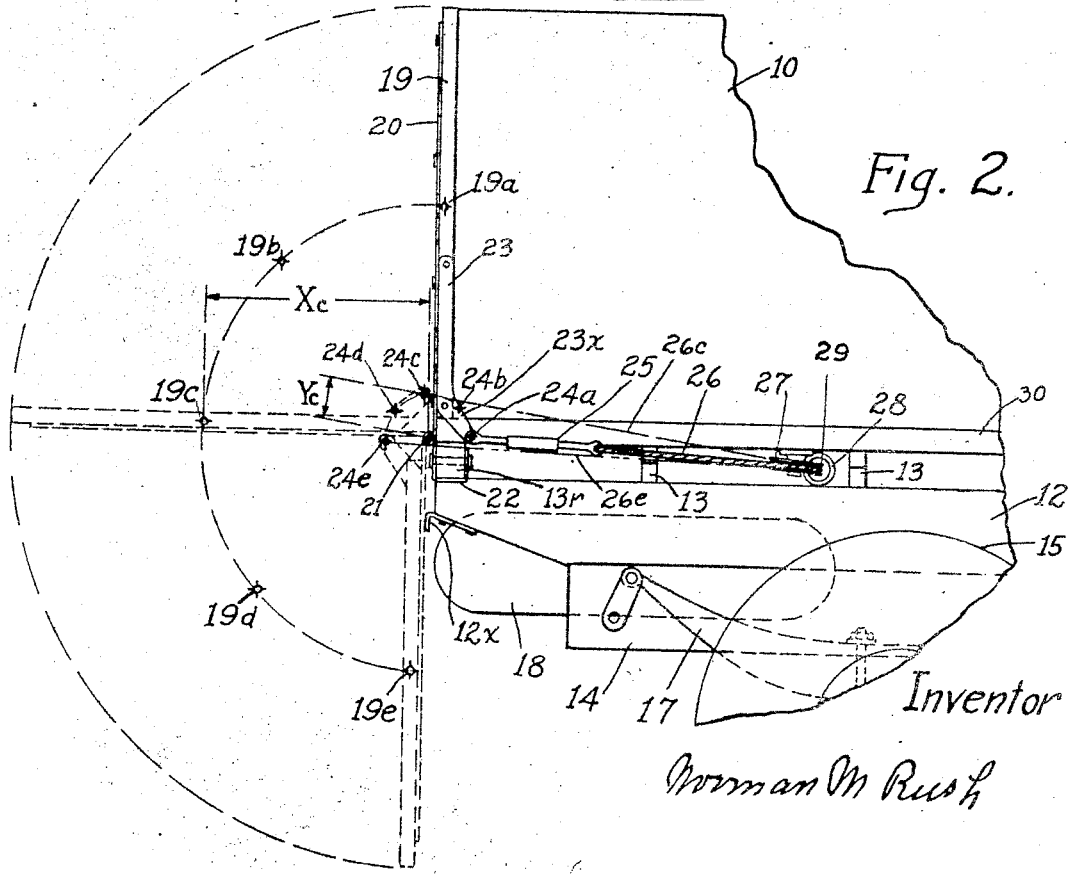
Inventor
Norman M Rush

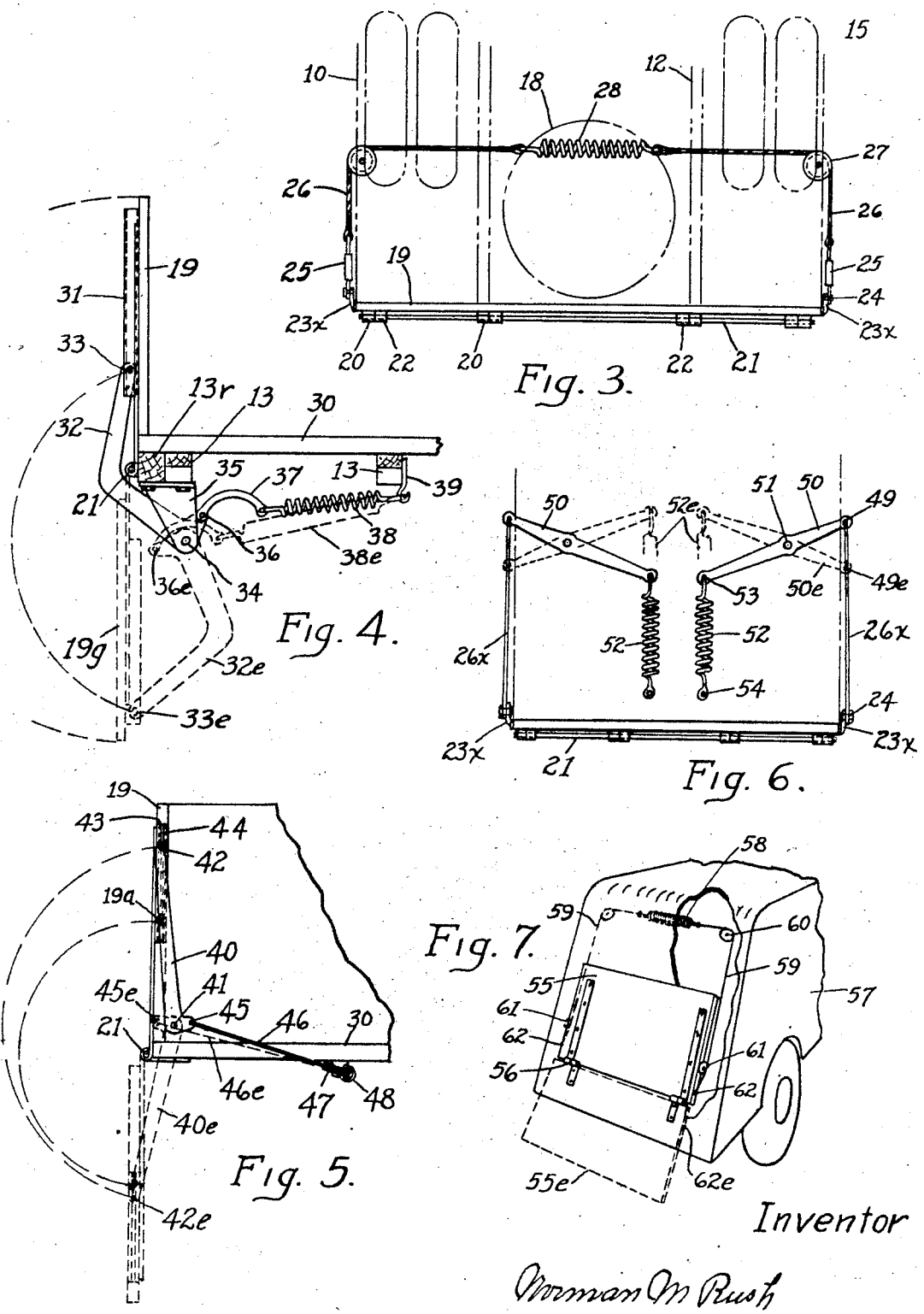

Patented Mar. 21, 1939

2,151,335

UNITED STATES PATENT OFFICE 2,151,335

TAILGATE MECHANISM FOR VEHICLES

Norman M. Rush, Willow Grove, Pa.

Application February 13, 1936, Serial No. 63,700

13 Claims. (Cl. 296—57)

This invention relates to tailboards or tailgates for vehicles and is especially directed toward the improvement of tailgate construction and mechanism for improved operation. It is of particular advantage to transport vehicles of large size.

The main object of the present invention is to provide a mechanism which will substantially balance the weight of the tailgate while it is being opened or closed.

In certain vehicles such as the heavier types of motor trucks or trailers, the tailgates are often of large size and excessive weight, requiring extreme effort on the part of an operator to open or close. During the first part of the movement, as a tailgate is being raised from the lowered or down position, the weight borne by the operator increases until it is maximum when the gate is in a horizontal position. In a large size tailgate, the height above the ground in this position is such that it requires a shift in the operator's position from one of lifting to one of pushing upward. Making this shift at the time when the maximum weight must be held requires considerable exertion and skill on the part of the operator. A slip at such a time might be the cause of accidental injury from being struck by the falling tailgate.

It is an object of this invention to provide a simple and effective mechanism to relieve the operator of most of the work involved in raising such heavy tailgates and also to permit a saving in time. A further object is to lessen upkeep, due to wear and damage caused by permitting heavy tailgates to swing open freely, with consequent shock and strain due to the impact caused by the sudden stop at the bottom of the swing.

It is a further object to provide a mechanism for accomplishing the above results, while at the same time interfering in no way with the normal use of the tailgate. The usual chain or latch is retained to fasten the tailgate in closed position. Also if it is desired to utilize the tailgate as a loading walkway, this may be accomplished in the usual manner using a chain or other means to support the tailgate in normal position.

It is also an object of this invention to provide a compact counterbalancing mechanism located so as to cause no interference with existing parts of the vehicle or accessories. Another object is to so construct a tailgate operating mechanism which causes little, if any, projection beyond the lateral edges of the vehicle.

An additional object is to provide a balancing mechanism which can be either readily adapted for application to existing vehicles or incorporated in new designs as a standard built-in unit.

How these and other objects incident to the invention are accomplished will be clearly understood from the following description in conjunction with the drawings of which—

Fig. 1 is a perspective view of the rear portion of a motor truck incorporating the present invention.

Fig. 2 is a side view of a portion of Fig. 1 to an enlarged scale, showing the tailgate mechanism.

Fig. 3 is a plan view of the tailgate mechanism showing other parts in chain dotted lines.

Fig. 4 is a side view of an alternative type of mechanism.

Fig. 5 is a side view of another alternative mechanism.

Fig. 6 is a diagrammatic plan view of a mechanism of the general type of Figs. 2 and 3 but having a modified detail arrangement.

Fig. 7 is a perspective view of the rear portion of a different type vehicle showing the application of the tailgate balancing mechanism.

Fig. 8 is a graph indicating the variation of the tailgate moment and the spring moment throughout the range of movement.

Referring to the drawings it will be seen that Fig. 1 shows the rear portion of a motor truck having a body 10, and superstructure 11. Longitudinal frame members 12, and transverse members 13, are supported by the channel members 14 of the truck chassis. Wheels and tires 15, axle 16, and springs 17 of the usual type are also shown. A spare tire 18 is shown being carried in a common location under the truck body. The large tailgate 19 is mounted by strap hinges 20, which also serve to reinforce the tailgate. The horizontal hinge rod 21 is supported by strap hinge parts 22 attached to the rear transverse frame member 13r of the body 10. Stops 12x may be provided to limit the open position of the tailgate.

A preferred form of the tailboard balancing mechanism is indicated in Fig. 1. The details of this mechanism are more clearly shown in Figs. 2 and 3. A fitting 23 is attached to each end of the tailgate 19. A projection 23x of fitting 23 is connected by means of pivot 24 to a turnbuckle 25. From the other end of the turnbuckle 25, a cable 26 extends around pulley 27 and is attached to spring 28. As will be seen most clearly from Fig. 3 a similar set of elements are arranged at the opposite side of the vehicle. A spring 28 thus floats between cables 26. In case very large loads are to be carried, it may be necessary to provide two springs, each having one end anchored, thus providing an independent system for each end of the tailboard.

The operation of the mechanism can best be seen by referring to Fig. 2. The tailgate 19 is indicated in full lines in its normal closed position. The center of gravity of the tailgate is shown at 19a. Two other positions of the tailgate are indicated in dotted lines, namely the horizontal position and the full open position. The center of gravity of the tailgate in these positions is shown in 19c and 19e. Two additional locations for the center of gravity (the 45° positions) are also indicated at 19b and 19d. It will be seen that in the closed position of the tailgate, the corresponding pivot location 24a is such that the line of pull of cable 26 passes above the tailgate hinge 21, thus exerting a small moment tending to hold the tailgate in its closed position.

Five positions of the pivot 24 are shown at 24a, 24b, 24c, 24d and 24e corresponding to the five positions of the tailgate center of gravity 19a, etc. The maximum moment required to be counterbalanced is that for the position 19c. In this position the cable 26 exerts its pull along the line 26c, thus supplying the counterbalancing moment about the hinge 21. The required force to be supplied by the spring 28 to balance the weight of the tailboard in this position can be calculated by taking the product of the weight of the tailboard and the distance from 19c to the hinge 21, (i. e. distance Xc) and dividing it by the distance of the line of pull 26c from hinge line 21, this latter distance being indicated in Fig. 2 by Yc.

By similar measurements and calculations for other positions of the tailgate, the ideal spring forces for these positions may be obtained. The spring elongation from closed position will be found by measuring the distance of the pivot 24 from point 29 for any given position of the tailgate and subtracting the distance between point 24a (closed position) and point 29. From these data an actual spring can be designed having characteristics which will provide balancing moments which closely approximate the theoretical moments required.

Figure 8 illustrates graphically the variation in moment of the tailgate (shown by full line) and also the balancing moment produced by a spring (shown by dotted line) having satisfactory characteristics. The actual unbalanced moment for any position may be obtained from the vertical distance between the two curves. It will be seen that at no position is there an appreciable nonbalancing moment. The tailgate producing the moments shown in Fig. 8 has a weight of 160 pounds and a height of 30 inches.

The greatest difference in moment appears in the closed position 19a and the open position 19e. Even in these positions, however, the residual moment is less than 340 inch lbs. which, when divided by the distance (30") of the top of the tailgate from its hinge 21, gives a force of only about 11 lbs. required to move the tailgate. In all other positions the force required to be applied by the operator is less than this amount. The small unbalanced moment in the two extreme positions is desirable, since it tends to maintain the tailgate in whichever extreme position to which it is moved.

The form of the invention illustrated in Figs. 1, 2 and 3 is particularly advantageous for application to trucks already in service since the pulleys 27 may be placed at any convenient location along the side of the body, the position being determined by the particular body and the obstructions to be cleared. The cables 26 may then be cut to proper length and spliced or otherwise fastened to spring 28. After assembly of the parts the initial tension may be applied to spring 28 by taking up on turnbuckles 25.

Referring to Fig. 4 it will be seen that a somewhat different form of mechanism is used to counterbalance the tailboard 19. In this case the mechanism is located centrally of the tailboard thus eliminating any projections beyond the ends of the tailgate. Most of the mechanism is located below the flooring 30. A channel-shaped member 31 is attached in a vertical position to the tailgate 19. Member 31 has its flanges turned inwardly so that the normally open channel is partly closed, leaving only a slot into which arm 32 projects. A pivot member 33 secures arm 32 in member 31 so that arm 32 may slide longitudinally in member 31, but cannot separate from it. Arm 32 is mounted to swing about pivot 34 in a bracket member 35, secured to the transverse frame members 13 and 13r. Pivot 36 attaches the lower end of arm 32 to a curved member 37 which in turn is connected with spring 38. Spring 38 is anchored to the vehicle frame by a hook 39. The open position of the tailgate is indicated at 19g in dotted outline with the other parts of the counterbalancing mechanism also shown.

It will be noted that the arm 32 is shaped to give clearance to parts of the vehicle frame in the closed position. Member 37 is curved to permit the pivot 36 to reach position 36e, in which position the line of the spring pull passes slightly below dead center with respect to pivot 34 in order to maintain the tailgate in the open position. During the opening of the tailgate 19, the pivot part 33 slides in the channel 31 until it reaches position 33e near the edge of the tailgate remote from the hinge 21. In this particular form of the invention, the arm 32 moves less than 180° for a tailgate movement of 180°, due to the offset of pivot 34 with respect to pivot 21. Since the force of spring 38 acting through pivot 36 in the closed position of the tailgate 19 is at a greater relative distance from pivot 34 than in the form of the invention shown in Figs. 1, 2 and 3 it is not necessary to have as great an initial deflection in the spring 38 to obtain the necessary balancing moment. The characteristic of the spring 38 will, therefore, be different from spring 28 of the first form of the invention since the movement of pivot 33 with respect to the tailgate introduces an additional variable. This form of the invention has advantages under certain conditions, especially where it is desirable to maintain all parts of the mechanism away from the ends of the tailboard. Also it is possible by introducing sufficient friction in the contact between pivot 33 and channel member 31, to provide a combination whereby the tailgate will remain in any position to which it is moved. This is accomplished because of the fact that the friction is sufficient to overcome any unbalanced moment due to the difference of the moment of the weight of the tailgate and the moment produced by the spring for any given position of the tailgate. In order to utilize this type of mechanism, however, it is necessary that the space underneath the flooring at the rear end of the vehicle be clear to permit installation.

Another form of the invention is shown in Fig. 5; this form also incorporates an arm or member which is connected to the tailgate but which has a motion relative thereto. An arm 40 is attached to the side of the vehicle body by pivot 41. Pivot 42 connects the upper end of arm 40 to a channel member 43, which is somewhat similar to member 31 (Fig. 4) but placed at the end of the tailgate. Pivot 42 slides in slot 44 of channel 43 when the tailgate is moved. This sliding motion is caused by the fact that pivot 41 which mounts the arm is offset with respect to hinge 21 of tailgate 19. A pivot 45 is indicated at the lower end of arm 40, and connected thereto is cable 46 which passes over pulley 47 and is attached to spring 48 located transversely under the floor boards 30, in a manner similar to that shown in Figs. 2 and 3.

The open position of the tailgate is indicated in dotted outline. It will be seen that pivot point 42 moves in slot 44 in a direction toward the hinge 21 during the opening of the tailgate. This is due to the relative location of pivot 41 above hinge 21. The arm 40 of Fig. 5 similarly to the arm 32 of Fig. 4, moves less than 180° for a tailgate movement of 180°. With a system as indicated in Fig. 5, it is possible to obtain moments which very closely counterbalance the tailgate moments for every position. Also, as in the form of the invention in Fig. 4, the introduction of friction at the pivot 42 will cause the tailgate to remain in any position to which it is moved.

Fig. 6 illustrates in plan view a somewhat different arrangement of the operating mechanism than that of Figs. 2 and 3. The arm 23x is connected to member 26x by pivot 24 in much the same manner as in Fig. 3. Instead of passing around a pulley, however, member 26x is fastened at point 49 on the outer end of arm 50, which is connected by pivot 51 to the under side of the vehicle body. To the other end of arm 50 is attached a spring 52 at point 53. Spring 52 is anchored to the vehicle frame at point 54. Upon moving the tailgate to its open position, the arm 50 is moved to position 50e, indicated in dotted outline. The spring 52 is shown elongated to position 52e. This particular form of the invention has certain advantages in that it eliminates the use of pulleys and therefore permits member 26x to be non-flexible. It also provides two independent systems, one for each side, so that in the event of the breakage of a spring or link there is still one half the counterbalance effective. Also for tailgates of smaller size it is possible to use only one half the system shown, but utilizing the standard parts used for the larger sized tailgates.

Fig. 7 illustrates in perspective a system having elements similar to the system of Figs. 2 and 3, but applied to a somewhat different type of vehicle. The rear of the vehicle shown represents one in which the external surface is smooth, none of the frame-work being exposed. The tailgate 55 does not extend completely across the vehicle. The hinges 56 are located somewhat above the lower edge of the body 57. The balancing mechanism is located inside the body of the vehicle, but close to the inner surface so as to give minimum obstruction. The spring 58 is located transversely of the body near the top. Cables 59 passing over pulleys 60 and 61 connect the spring 58 with point 62 at the ends of the tailgate. Pulleys 61 are mounted on the body 57 in a position to guide the cables 59 in a direction to give the proper relationship to the hinges 56, and at the same time allow the cables 59, pulleys 60 and spring 58 to lie close to the inner surface of the body of the vehicle. The location of the pivotal connections 62 of the cable 59 to the tailgate 55 is such as to give a relative position with respect to the hinge line of hinges 56 essentially similar to that shown in Fig. 2. With the tailgate in closed position, the line of pull of cable 59 through pivot point 62 passes slightly above the center line of hinges 56 to provide a small moment tending to maintain the tailgate in its closed position. The tailgate is shown in dotted outline in its open position 55e, which is approximately 180° from its closed position. In this position, the line of pull of the cable 59 between the pulley 61 and the pivot 62e is slightly below the axis of pivot 56. Thus it will be seen that the action of the mechanism as applied in Fig. 7 is essentially the same as that in Figs. 1, 2 and 3.

It will be evident from the foregoing description that my invention provides a simple and effective means of balancing the weight of the tailgate of a vehicle for essentially its total movement of 180°. It will also be seen that the mechanism of the present invention can be readily adapted to suit the needs of various types and sizes of vehicles.

This invention is of definite advantage in reducing the upkeep of vehicles of the transport type by eliminating a source of damage, caused by rough handling of heavy tailgates. At the same time it is of great benefit to operators in relieving them of the necessity of expending considerable energy and time in the handling of tailgates equipped with this invention. It will also be evident that due to the relative simplicity of the mechanism it can be readily installed, at low cost, to vehicles either before or after they have left the factory.

I claim:

1. For a vehicle body, a tailgate having a horizontal hinge, said tailgate being substantially vertical in closed position, a mechanism capable of substantially balancing the moment of the tailgate about said hinge throughout a range of movement of approximately 180 degrees of the tailgate, said mechanism including a fitting attached to the tailgate and having a pivot whose axis is parallel to said hinge and offset therefrom, a resilient element operatively associated with said pivot and the vehicle body to exert a force through said pivot, said pivot being located with respect to said hinge in a position for said force to provide a generally increasing moment during the first 90 degrees movement of the tailgate from closed position and a generally decreasing moment during the second 90 degrees movement, the rate of increase and decrease being substantially the same as the rate of increase and decrease of the tailgate moment, said resilient element developing a continuously increasing force during both the first and second 90 degree movements of the tailgate.

2. For a vehicle body, a tailgate having a horizontal hinge, said tailgate being substantially vertical in closed position, a mechanism capable of substantially balancing the moment of the tailgate about said hinge throughout a range of movement of approximately 180 degrees, said mechanism including a spring located close to the body of the vehicle and supported thereon, means operatively connecting the tailgate and spring including a pivot device fastened to the end of the tailgate, a member pivoted to said pivot device in a fashion to permit a change greater than 120 degrees of the included angle between said means and the line through said hinge and said pivot device, said member being positioned to lie close to the body of the vehicle and transmit the spring force to said pivot device, and means secured to said body and associated with said member for changing the line of the spring force.

3. For a vehicle body, a tailgate having a horizontal hinge, said tailgate being substantially vertical in closed position, a mechanism capable of substantially balancing the moment of the tailgate about said hinge throughout a range of movement of approximately 180 degrees, said mechanism including a spring located close to the body of the vehicle and supported thereon, means operatively connecting the tailgate and spring including a pivot device fastened to each end of the tailgate, a tension member pivoted to each of said pivot devices and positioned to lie close to the body of the vehicle and transmit the spring force to said pivot devices, means associated with said tension members and secured to each side of the body of the vehicle for changing the direction of the spring force, said spring supplying the force for both ends of the tailgate.

4. For a vehicle body, a tailgate having a horizontal hinge, a mechanism capable of substantially balancing the moment of the tailgate about said hinge throughout a range of movement of approximately 180 degrees from an upright position, said mechanism including a spring arranged to provide a force reacting between the body of the vehicle and the tailgate, the direction of the spring force being transverse to the end of said tailgate, a fitting fastened to the end of said tailgate and having a horizontal pivot, tension means connecting said spring to said pivot in a fashion to permit an angular change greater than 120 degrees between said means and the line through said hinge and said pivot device, and a pulley mounted on said body and arranged to guide a portion of the tension means to lie close to the body of the vehicle.

5. For a vehicle body, a tailgate having a horizontal hinge, said tailgate being substantially vertical when in closed and open positions, a mechanism capable of substantially balancing the moment of the tailgate about said hinge throughout a range of movement of approximately 180 degrees of the tailgate, said mechanism including a fitting attached to the tailgate and having a pivot whose axis is parallel to said hinge and offset therefrom, a coiled spring element positioned with its longitudinal axis parallel to the longitudinal axis of the vehicle, one end of the spring element being anchored to the body of the vehicle, said spring element being operatively associated with said pivot to exert a force thereon, said pivot being located with respect to said hinge in a position for said force to provide a generally increasing moment during the first 90 degrees movement of the tailgate from closed position and a generally decreasing moment during the second 90 degrees movement, the rate of increase and decrease being substantially the same as the rate of increase and decrease of the tailgate moment, said spring producing a continuously increasing force during both said first and said second 90 degrees movement.

6. For a vehicle body, a tailgate having a horizontal hinge, a mechanism capable of substantially balancing the moment of the tailgate about said hinge throughout a range of movement of approximately 180 degrees from an upright position of the tailgate, said mechanism including an arm member pivotaly mounted to the body of the vehicle on a pivot offset from the tailgate hinge, means for connecting one end of said arm member to the tailgate for pivotal and sliding movement with respect thereto, a spring mounted to provide a reaction between the body and said arm member, an element connecting said spring and said arm member, said element being pivotally fastened to said arm member at a point near the pivotal mounting of the arm member to the body of the vehicle.

7. For a vehicle body, a tailgate having a horizontal hinge, a mechanism capable of substantially balancing the moment of the tailgate about said hinge throughout a range of movement of approximately 180 degrees from an upright position of the tailgate, said mechanism including an arm member located midway between the ends of the tailgate and pivotally mounted to the body of the vehicle on a pivot offset forwardly from and below the tailgate hinge, means for connecting one end of said arm member to the tailgate for pivotal and sliding movement with respect thereto, a spring mounted to provide a reaction between the body and said arm member, a link connecting said spring and said arm member, said link being pivotally fastened to said arm member at a point near the pivotal mounting of the arm member to the body of the vehicle and being shaped to provide clearance when the tailgate is moved to the open position.

8. For a vehicle body, a tailgate having a horizontal hinge, a mechanism capable of substantially balancing the moment of the tailgate about said hinge throughout a range of movement of approximately 180 degrees from an upright position of the tailgate, said mechanism including an arm member located at the end of the tailgate and pivotally mounted to the body of the vehicle on a pivot offset forwardly from and above the tailgate hinge, means for connecting one end of said arm member to the tailgate for pivotal and sliding movement with respect thereto, a coil spring mounted under the body of the vehicle to provide a force reacting between said body and said arm member, a tension element transmitting the force and pivotally fastened to said arm member at a point near the pivotal mounting of the arm member on the body of the vehicle, and means anchored to the body of the vehicle for changing the direction of said spring force.

9. A tailgate mechanism for vehicle bodies, said tailgate being located in a substantially vertical plane when in closed position, a horizontal hinge about which the tailgate is capable of movement through approximately 180°, a pivot member attached to each end of said tailgate, a spring having its longitudinal axis parallel to said hinge, tension cables connected to each of said pivot members and located in part in vertical planes parallel to the longitudinal axis of the vehicle body just outside the ends of said tailgate for transmitting the spring force to said pivot members, pulleys attached to the vehicle body and associated with said tension cables to change their direction through 90°, said cables being connected to the ends of said spring.

10. A tailgate mechanism for vehicle bodies, said tailgate being located in a substantially vertical plane when in closed position, a horizontal hinge about which the tailgate is capable of movement through approximately 180°, a pivot member attached to each end of said tailgate, a spring having its longitudinal axis parallel to said hinge and located under the floor of said body in front of said hinge, tension cables connected to each of said pivot members and located in part close to and parallel to the outside surface of the vehicle body, means attached to the vehicle body and associated with said cables to change their direction, said means being located in a position to bring the cables into alignment with the axis of said spring, said cables being connected to the ends of said spring and transmitting the force of said spring to said pivot members.

11. A tailgate mechanism for a vehicle body of the closed type, said tailgate being located in a substantially vertical plane when in closed position, a horizontal hinge about which the tailgate is capable of movement through approximately 180°, a pivot member attached to each end of said tailgate, a spring having its longitudinal axis parallel to said hinge and positioned near the inside top surface of the body, tension cables connected to each of said pivot members, means attached to the body and operatively associated with said cables to direct them into a position closely adjacent to the inside surface of the vehicle body, additional means attached to the vehicle body and associated with said cables to change their direction and bring them into alignment with the axis of said spring, said cables being connected to the ends of said spring.

12. The combination, with a vehicle body and a tailgate mounted thereon by a horizontal pivot for movement through approximately 180 degrees from an upright position to a depending position, of mechanism for substantially counterbalancing the unbalanced weight of the tailgate throughout the major part of its range of movement including a spring reacting between the body and the tailgate and means forming the interconnection between said spring and tailgate including a pivot offset from the tailgate pivot axis and movable with the tailgate in an arcuate path such that a variable moment balancing the tailgate is exerted thereon by said spring throughout the said major part of the range of movement, said means, said offset pivot and said horizontal pivot being arranged to clear each other in all positions throughout the tailgate movement.

13. The combination, with a vehicle body and a tailgate mounted thereon by a horizontal pivot for movement through approximately 180 degrees from an upright position to a depending position, of mechanism for substantially counter-balancing the unbalanced weight of the tailgate throughout the major part of its range of movement including a spring reacting between the body and the tailgate and means forming the interconnection between said spring and tailgate including a member having a pivot offset from the tailgate pivot axis and rotatable upon movement of the tailgate in an arcuate path such that a variable moment balancing the tailgate is exerted thereon by said spring throughout the said major part of the range of movement, the line of the spring reaction passing close to the axis of rotation of said member when the tailgate is in one of its vertical positions thereby producing a continuous increase in the spring reaction during substantially the full 180 degrees movement of the tailgate in one direction.

NORMAN M. RUSH.